United States Patent
Kim

(10) Patent No.: US 11,804,592 B2
(45) Date of Patent: Oct. 31, 2023

(54) HIGH-ENERGY CATHODES, BATTERIES, AND METHODS OF MAKING THE SAME

(71) Applicant: Jangwoo Kim, San Marcos, TX (US)

(72) Inventor: Jangwoo Kim, San Marcos, TX (US)

(73) Assignee: WATTRII, INC., Austin, TX (US)

( * ) Notice: Subject to any disclaimer, the term of this patent is extended or adjusted under 35 U.S.C. 154(b) by 0 days.

(21) Appl. No.: 17/650,652

(22) Filed: Feb. 10, 2022

(65) Prior Publication Data

US 2022/0263088 A1 Aug. 18, 2022

Related U.S. Application Data

(63) Continuation-in-part of application No. 17/175,267, filed on Feb. 12, 2021, now Pat. No. 11,374,209, and a continuation-in-part of application No. 17/220,823, filed on Apr. 1, 2021, now Pat. No. 11,380,893.

(51) Int. Cl.
*H01M 4/36* (2006.01)
*H01M 4/66* (2006.01)
*H01M 4/62* (2006.01)
*H01M 50/411* (2021.01)
*H01M 10/0569* (2010.01)
*H01M 4/136* (2010.01)
*H01M 4/58* (2010.01)

(52) U.S. Cl.
CPC ........... *H01M 4/366* (2013.01); *H01M 4/136* (2013.01); *H01M 4/58* (2013.01); *H01M 4/625* (2013.01); *H01M 4/662* (2013.01); *H01M 10/0569* (2013.01); *H01M 50/411* (2021.01)

(58) Field of Classification Search
None
See application file for complete search history.

(56) References Cited

U.S. PATENT DOCUMENTS

| | | | |
|---|---|---|---|
| 9,054,383 B2 | 6/2015 | Roev | |
| 9,306,213 B2 | 4/2016 | Tsunozaki | |
| 9,960,451 B1 | 5/2018 | Zhamu | |
| 10,033,030 B1 | 7/2018 | Vajo | |
| 10,608,284 B2 | 3/2020 | Rustomji | |
| 11,380,893 B1 * | 7/2022 | Kim | H01M 4/525 |
| 2012/0021303 A1 | 1/2012 | Amendola | |
| 2012/0183853 A1 | 7/2012 | Chu | |
| 2013/0302688 A1 | 11/2013 | Takezawa | |
| 2014/0170465 A1 | 6/2014 | Visco | |
| 2017/0077564 A1 | 3/2017 | Wang | |
| 2017/0110701 A1 | 4/2017 | Shi | |
| 2017/0207449 A1 | 6/2017 | Kang | |
| 2018/0006306 A1 | 1/2018 | Zhu | |
| 2018/0261842 A1 | 9/2018 | Park | |
| 2019/0372104 A1 | 12/2019 | Nose | |
| 2019/0386337 A1 * | 12/2019 | Zhamu | H01M 4/366 |

FOREIGN PATENT DOCUMENTS

EP 3118916 A1 1/2017

OTHER PUBLICATIONS

International Search Report for related Intl. Appl. Ser. No. PCT/US2022/070632, dated Apr. 14, 2022.

* cited by examiner

*Primary Examiner* — Laura Weiner
(74) *Attorney, Agent, or Firm* — Raven Patents, LLC; Anton E. Skaugset

(57) ABSTRACT

Cathode active materials that include a metal compound having the formula $M_aR_b$, where M is a metal, each R is independently selected so that $M_aR_b$ is an inorganic or organometallic compound or complex, and a and b are independently positive nonzero real numbers; and a metal oxide having the formula $M_xO_y$, where M is the same metal in the metal compound, and x and y are independently positive nonzero real numbers; provided that the metal compound and the metal oxide are in contact. The cathodes can be economically incorporated into batteries that can provide high energy density.

17 Claims, 6 Drawing Sheets

HIGH-ENERGY CATHODES, BATTERIES, AND METHODS OF MAKING THE SAME

CROSS-REFERENCE TO RELATED APPLICATIONS

This application is a continuation-in-part under 35 U.S.C. § 120 of U.S. patent application Ser. No. 17/175,267, filed Feb. 12, 2021, now U.S. Pat. No. 11,374,209; and a continuation-in-part under 35 U.S.C. § 120 of U.S. patent application Ser. No. 17/220,823, filed Apr. 1, 2021, now U.S. Pat. No. 11,380,893, each of which is hereby incorporated by reference for all purposes.

TECHNICAL FIELD

This disclosure relates to cathode active materials, methods of manufacturing the cathode active materials, cathodes that include the cathode active materials, and batteries that incorporate such cathodes.

BACKGROUND

Batteries are ubiquitous in modern technology, being used in a wide range of applications from small batteries for industrial and medical devices, to larger batteries for electric vehicles and grid energy storage systems. Perhaps the most well-known and widely-used battery technology at the present are lithium-ion batteries, which use an intercalated lithium compound as one electrode material and employ lithium ions shuttling between the cathode and anode in the pond of electrolyte. While lithium-ion batteries possess many advantages, they provide relatively low energy densities, and may require expensive materials for manufacture.

Lithium-air or lithium-oxygen batteries are considered to be 'next generation' lithium-ion battery technology, and are known to outperform today's lithium-ion batteries in many aspects, such as energy density and the cost of materials. These batteries consume oxygen and generate reactive oxygen species that function as the cathode active material. However, such batteries are prone to oxygen desorption at comparatively low temperatures during operation, and produce electrochemically irreversible byproducts that seriously hinder the rechargeability of the batteries. Such oxygen desorption or reactive oxygen species dissociation may also cause a thermal runaway reaction in the battery.

What is needed is an improved cathode, which incorporates improved cathode active materials, and which can provide greater energy density, more economical manufacturing costs, and lower materials costs, while at the same time exhibiting greater electrochemical reversibility and resistance to oxygen generation during use.

SUMMARY

The disclosure is directed to cathode active materials and their methods of manufacture, as well as cathodes incorporating the cathode active materials, and batteries that incorporate such cathodes.

In one example, the disclosure is directed to cathode active materials that include a metal compound having an empirical formula of $M_aR_b$, where M is a metal; each R is independently selected so that $M_aR_b$ is an inorganic or organometallic compound or complex; and a and b are independently positive nonzero real numbers; and a metal oxide having an empirical formula of $M_xO_y$, where M is the same metal in the metal compound, and x and y are independently positive nonzero real numbers; provided that the metal compound and the metal oxide are in contact.

In another example, the disclosure is directed to cathode materials that include a cathode active material having a metal compound having an empirical formula of $M_aR_b$, where M is a metal; each R is independently selected so that $M_aR_b$ is an inorganic or organometallic compound or complex; and a and b are independently positive nonzero real numbers; and a metal oxide having an empirical formula of $M_xO_y$, where M is the same metal in the metal compound, and x and y are independently positive nonzero real numbers; such that the metal compound and the metal oxide are in contact; and an electrically-conductive material; such that one or both of the metal compound and the metal oxide are in contact with the electrically-conductive material.

In another example, the disclosure is directed to batteries having a cathode and an electrolyte, where the cathode includes a cathode active material that includes a metal compound having an empirical formula of $M_aR_b$, where M is a metal; each R is independently selected so that $M_aR_b$ is an inorganic or organometallic compound or complex; and a and b are independently positive nonzero real numbers; and a metal oxide having an empirical formula of $M_xO_y$, where M is the same metal in the metal compound, and x and y are independently positive nonzero real numbers; where the metal compound and the metal oxide are in contact.

The disclosed features, functions, and advantages of the disclosed cathode active materials, cathodes, and batteries may be achieved independently in various embodiments of the present disclosure, or may be combined in yet other embodiments, further details of which can be seen with reference to the following description and drawings.

DETAILED DESCRIPTION

Figure 1:
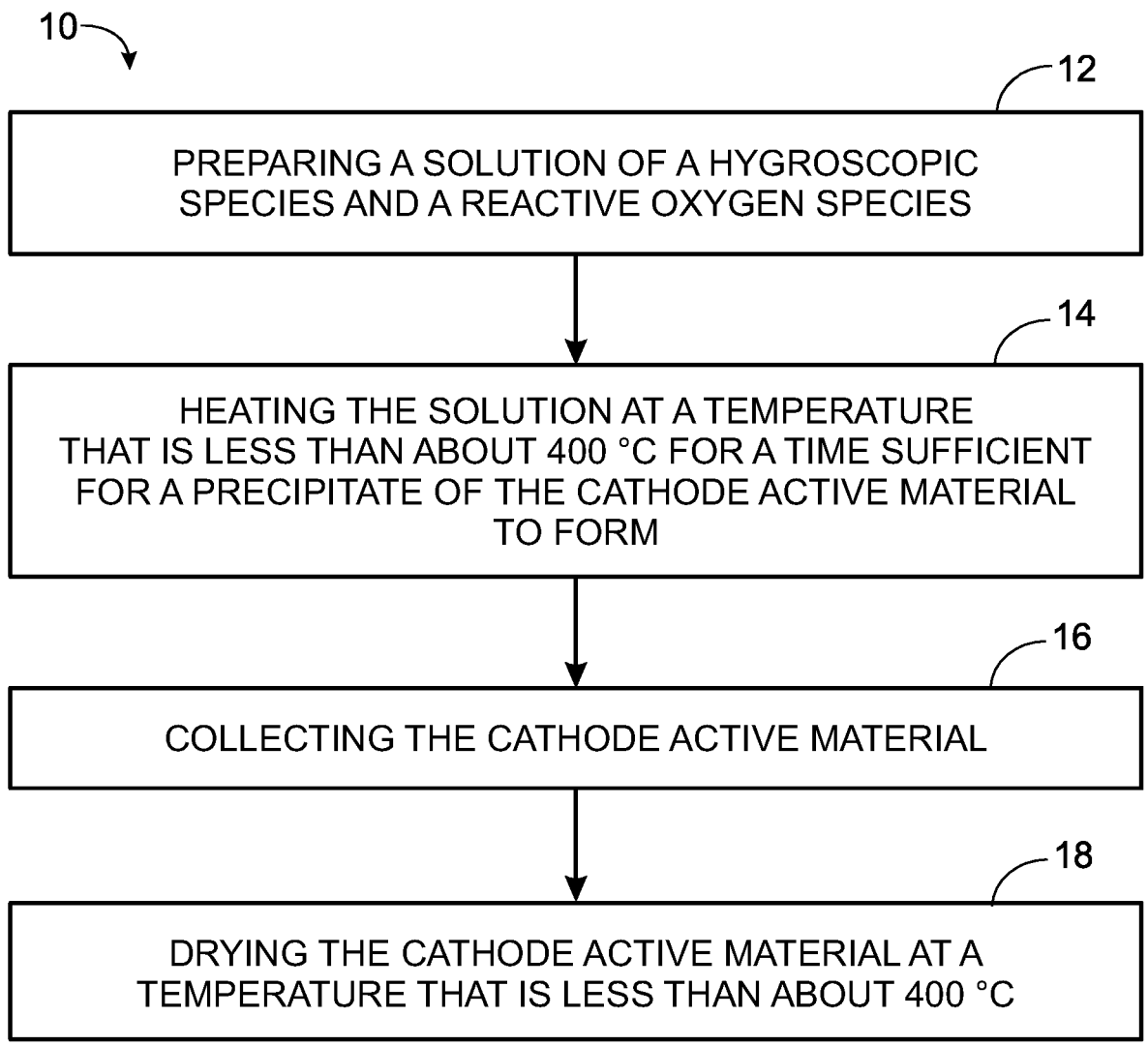
FIG. 1 is a flowchart of an illustrative method of manufacturing a cathode active material according to the present disclosure.

The present disclosure provides high energy density cathode active materials, which may be produced inexpensively, and can be used to prepare cathodes for use in batteries. Selected cathodes prepared according to the present disclosure evolve substantially no gaseous oxygen during operation of a battery that includes the cathode. In some aspects, cathodes prepared according to the present disclosure evolve gaseous oxygen at a rate of less than about 1 mg per 1 mAh during a full lifecycle of a battery that includes the cathode.

As used herein, the term "full lifecycle of the battery" is intended to mean that the life of the battery is considered to have exceeded its normal useful life, which is assumed here to be the point at which the battery shows 80% of its original capacity for the first time.

The cathode active material dictates the differences in composition when building positive electrodes for battery cells, and it is therefore the cathode active material that determines the type of the battery. For instance, LFP battery (deevs.com/news/563506/tesla-transition-ess-lfp-batteries) is a battery that includes LFP (lithium iron phosphate, LiFePO4) as its cathode active material. Cathode active materials are responsible for supplying ions through an electrolyte and electrons through an external circuit while the battery is charging and for accepting ions through the electrolyte and electrons through the external circuit while the battery is discharging. On the other hand, the anode active materials are responsible for supplying ions through an electrolyte and electrons through an external circuit while the battery is discharging and for accepting ions through the electrolyte and electrons through the external circuit while the battery is charging. Both the cathode active material and the anode active material participate in the electrochemical redox reaction by transporting ions through an electrolyte and/or electrons through an external circuit.

Any coatings, natural or artificial layers, protective layers of any kind on the surface of the cathode active material or the anode active material that do not participate in the electrochemical redox reaction during charging and discharging of the battery shall not be considered as part of the respective active materials.

A "redox reaction" refers to a type of chemical reaction in which the oxidation state of participating atoms, molecules, radicals, or ions are changed by gaining or losing electrons. Redox reactions are characterized by the actual or formal transfer of electrons between chemical species, most often with one species undergoing oxidation while another species undergoes reduction.

A "current collector" refers to the component adjacent to an electrode configured to convey current from a fixed to a moving portion of the circuit of the electrochemical cell, or vice versa. A current collector is a bridging component that collects electrical current generated at an electrode and provides a connection to the external circuit. The current collector is typically adjacent to the cathode or the anode. In some embodiments, the current collector includes an electrically-conductive material, that is a porous carbon material that may be selected from carbon black, carbon nanotubes, carbon nanofibers, carbon dots, activated carbon, graphite, graphene, graphene oxide, reduced graphene oxide, and graphene nanoribbons.

An "electrolyte" or "electrolytic solution" refers to a material that provides for ion transport within an electrochemical cell. An electrolyte acts as a conduit for ion transport through its interaction with an electrode. In particular, during charging of the electrochemical cell, the electrolyte can facilitate the movement of ions from the cathode to the anode, and upon discharge, facilitate the movement of ions from the anode to the cathode.

As used herein, "room temperature" is any temperature within a range of air temperatures that most people prefer for indoor settings, and which feel comfortable when wearing typical indoor clothing. More specifically, room temperature includes temperatures from 15 to 30° C. (or 59 to 86° F.).

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" may be used to distinguish or identify various members of a group, or the like, and are not intended to show serial or numerical limitation.

Unless they relate to specific examples, all specifications regarding quantities and portions, particularly those for delimiting the invention, indicate a ±10% tolerance, for example: 11% means: from 9.9% to 12.1%. For terms such as "a solvent", the word "a" is not to be regarded as a numerical word but as an indefinite article or as a pronoun, unless the context indicates otherwise.

The term: "combination" or "combinations" means, unless otherwise stated, all types of combinations, starting from two of the relevant constituents, to a plurality or all of such constituents.

Preparing Cathode Active Material

An illustrative method of manufacturing a high-energy cathode active material according to the present disclosure is depicted in flowchart 10 of FIG. 1. The method includes preparing a solution of a hygroscopic species and a reactive oxygen species, at step 12 of flowchart 10; heating the solution at a temperature that is less than about 400° C. for a time sufficient for a precipitate of the cathode active material to form, at step 14 of flowchart 10; collecting the precipitated cathode active material, at step 16 of flowchart 10; and drying the collected cathode active material at a temperature that is less than about 400° C., at step 18 of flowchart 10. The precipitate can be a reactive oxygen species derivative, a reactive oxygen species derivative combined with the hygroscopic species, or a reactive oxygen species combined with the hygroscopic species.

The hygroscopic species used to prepare the cathode active material can be any hygroscopic species that forms a precipitate when heated with an appropriate reactive oxygen species in a solution. Typically, the hygroscopic species is a compound or substance that attracts water from its environment, either by chemical reaction, by incorporating water of hydration, or by physical adsorption. In particular, the hygroscopic species may be substantially free of transition metals. Particularly useful hygroscopic materials can include one or more ionic materials and/or one or more organic materials.

Where the hygroscopic species includes one or more ionic materials, the ionic materials may include one or more ionic compounds, where the ionic compounds are typically salts, and more typically chloride, bromide, pentoxide, sulfide, and/or sulfate salts. The ionic material can also be an acid capable of donating a proton.

Where the hygroscopic species includes one or more organic materials, the organic materials may be selected from any suitable organic compound, or fragment of an organic compound, that incorporates one or more nitrogen or oxygen atoms. For example, the one or more organic materials can be selected from among truxenone, truxenone derivatives, phenoxazine, phenoxazine derivatives, phenothiazine, phenothiazine derivatives, quinone, quinone derivatives, diamine derivatives, phenazine, phenazine derivatives, quinoxaline, quinoxaline derivatives, pyrazine, pyrazine derivatives, triazine, triazine derivatives, dimethoxybenzene, dimethoxybenzene derivatives, cyclopropenium derivatives, and amide derivatives.

Selected examples of hygroscopic species for the present disclosure may include $C_6H_{14}Cl_4N_4$ (benzenetetramine tetrahydrochloride), $C_6H_{16}O_{14}$ (hexaketocyclohexane octahydrate), $C_8H_6O_4$ (terephthalic acid), LiOH (lithium hydroxide), NaOH (sodium hydroxide), $C_{13}H_{22}NO_3$ (tetramethylpiperidine-1-oxyl-4-yl methacrylate), LiCl (lithium chloride), NaCl (sodium chloride), HCl (hydrogen chloride), HBr (hydrogen bromide), LiBr (lithium bromide), $NaClO_3$ (sodium chlorate), $P_2O_5$ (phosphorus pentoxide), $H_2S$ (hydrogen sulfide), $H_2SO_4$ (hydrogen sulfate), $HClO_3$ (chloric acid), $C_7H_6O_2$ (benzoic acid), $C_2HF_3O_2$ (trifluoroacetic acid), HBO (metaboric acid), $C_7H_6O_3$ (salicylic acid), $C_2H_4O_2$ (acetic acid), $C_{16}H_{32}O_2$ (palmitic acid), HSCN (thiocyanic acid), $C_3H_6O_3$ (lactic acid), $H_3PO_4$ (phosphoric acid), $CH_2O_2$ (formic acid), $C_{12}H_{23}N$ (dicyclohexylamine), $C_2H_6N$ (dimethylamine), $C_6H_5SH$ (thiophenol), $C_6H_2O_6$ (rhodizonic acid), $C_{16}H_8O_6$ (anthraquinone-2,3-dicarboxylic acid), $C_6H_2Cl_2O_4$ (chloranilic acid), and $C_{22}H_{24}N_4O_4$ (naphthalenediimide), among others.

The reactive oxygen species can be any species that includes one or more reactive oxygen moieties. For example, the reactive oxygen species can include one or more reactive oxygen moieties such as peroxides, superoxides, superoxide radicals, hydroxyl radicals, peroxyl radicals, perhydroxyl radical, hydroperoxyl radicals, alkoxyl radicals, singlet oxygen, hypochlorous acid, and alpha-oxygen. In one embodiment of the present disclosure, the reactive oxygen species includes at least one peroxide moiety. The reactive oxygen species may be selected from one or more of $Li_2O_2$ (lithium peroxide), $H_2O_2$ (hydrogen peroxide), HOCl (hypochlorous acid), $O_2^{*-}$ (superoxide radical), $NaO_2$ (sodium superoxide), NO* (nitroxyl radical), $C_6H_5O*$ (phenoxyl radical), and $^1O_2$ (singlet oxygen), among others.

Upon reaction, the reactive oxygen species is typically converted to a reactive oxygen species derivative. The reactive oxygen species derivative can be any species that is derived from the reactive oxygen species, and can be distinguished from the reactive oxygen species in that the reactive oxygen species derivative no longer includes a reactive oxygen moiety such as a peroxide, superoxide, superoxide radical, hydroxyl radical, peroxyl radical, perhydroxyl radical, hydroperoxyl radical, alkoxyl radical, singlet oxygen, hypochlorous acid, and alpha-oxygen.

Any method of preparing the solution of the hygroscopic species and reactive oxygen species is a suitable method for the purposes of the method of flowchart 10. For example, preparing a solution of the one or more hygroscopic species and the one or more reactive oxygen species can include the addition of each of the desired hygroscopic species and reactive oxygen species to a single solution to form the desired combined solution. Alternatively, one or both of the hygroscopic species and reactive oxygen species can be initially dissolved in a solvent, and the hygroscopic species solution and the reactive oxygen species solution can then be combined to form the combined solution, or both can be added to an existing solution to form the combined solution.

The resulting solution is then heated at a temperature that is less than about 400° C., but high enough to result in formation of a precipitate of the desired cathode active material. The heating temperature is preferably less than about 300° C., and more preferably less than about 200° C. It should be appreciated that it is normally not possible to heat a solution to temperatures higher than the boiling point of the solution under standard conditions, and so the combined solution should be transferred to a sealed vessel, or autoclave, for heating under elevated pressure. The atmosphere of the sealed vessel, or autoclave can be replaced with high purity oxygen gas during the heat treatment.

When the combined solution has been heated for a time sufficient for a precipitate of the cathode active material to formed, the cathode active material can be collected. Any appropriate separation method can be used to collect the cathode active material precipitate, but typically the precipitate mixture is filtered, and washed. Included in the step of collecting the cathode active material, the filtered and washed cathode active material can be dried under vacuum or under an inert gas atmosphere, typically at a temperature less than about 400° C. The drying temperature is preferably less than about 300° C., and more preferably less than about 200° C.

Testing or further handling of the collected and dried cathode active material should be done under dry conditions, for example in a relative humidity of less than about 25%. Preferably, such handling would be performed in a dry room.

Cathode Active Material

During preparation of the cathode active material, the hygroscopic species and the reactive oxygen species typically undergo a reaction to produce a cathode active material that includes one or more new materials. In one aspect of the present disclosure, the combination of the hygroscopic species and the reactive oxygen species produces a cathode active material that includes a metal compound and a metal oxide. The metal compound and metal oxide may be separate components of the cathode active material, such as where the cathode active material includes a heterogenous mixture. Alternatively, or in addition, the metal compound and the metal oxide may be associated with one another in a complex, a cluster, or in a crystalline, quasi-crystalline, or amorphous matrix. In one embodiment, one or more of the hygroscopic species is the metal compound. Typically, the cathode active material includes the metal compound and the metal oxide in such a way that the metal compound and the metal oxide are in contact.

The metal compound of the cathode active material may be described by the empirical formula $M_aR_b$, where M is a metal, and each R moiety is independently selected from any appropriate atom, molecule, or radical such that $M_aR_b$ is an inorganic or organometallic compound or complex. Each R moiety may independently have a formal oxidation state of −1, −2, or −3. Typically, each R moiety has a formal oxidation state of −1. The values of a and b are independently positive nonzero real numbers. Each R may be a fragment or substituent of a larger compound.

In one embodiment, one or more R moieties may independently be or include one or more of hydrogen, nitrogen, chlorine, bromine, fluorine, sulfur, phosphorous, and boron. Alternatively, or in addition, each R may independently be an inorganic moiety, or an organic moiety.

Each R moiety that is an inorganic moiety may be selected from hydride, halide, oxide, hydroxide, chlorate, sulfide, sulfate, metaborate, thiocyanate, amide, nitride, and azide, among others.

Each R moiety that is an organic moiety optionally further includes one or more heteroatoms independently selected from nitrogen, chlorine, bromine, fluorine, sulfur, phosphorous, and boron. In some embodiments, each R that is an organic moiety excludes alkali metals, alkaline-earth metals, or transition metals. In some embodiments, the R moiety may comprise carbon, hydrogen, or oxygen. In some embodiments, the R moiety is an organic moiety having 1-6 carbons.

Non-exclusive examples of suitable R moieties for the present disclosure can include —H (hydride), —OH (hydroxyl), —COOH (carboxyl), —CH (alkyne), —CH$_2$ (alkene), —CHO (aldehyde), —CO— (carbonyl), —COO— (ester), —O— (ether), —NH$_2$ (amine), —CN (nitrile), alkylhalide, oxyhalide, alkane, alkene, alkyne, arene, phenyl, thiol, thial, sulfide, sulfoxide, sulfone, ketone, amide, haloalkane, methoxide, ethoxide, epoxide, phenoxide, nitride, nitrate, nitroso, quinone, imine, imide, azide, lactate, phosphate, formate, and cyanate, among others.

Selected examples of the metal compound of the cathode active material can include LiOH (lithium hydroxide), LiCl (lithium chloride), NaCl (sodium chloride), LiBr (lithium bromide), NaClO$_3$ (sodium chlorate), Li$_2$S (lithium sulfide), Li$_2$SO$_4$ (lithium sulfate), LiC$_7$H$_5$O (lithium benzoate), LiC$_2$F$_3$O$_2$ (lithium trifluoroacetate), LiCH$_3$O (lithium methoxide), LiBO$_2$ (lithium metaborate), LiC$_7$H$_5$O$_3$ (lithium salicylate), LiC$_2$H$_3$O$_2$ (lithium acetate), LiC$_{16}$H$_{31}$O$_2$ (lithium palmitate), LiSCN (lithium thiocyanate), LiC$_9$H$_{18}$N (lithium 2,2,6,6-tetramethylpiperidide), LiC$_3$H$_5$O (lithium lactate), Li$_3$PO$_4$ (lithium phosphate), LiCHO$_2$ (lithium formate), LiBH$_4$ (lithium borohydride), LiC$_{12}$H$_{22}$N (lithium dicyclohexylamide), LiNH$_2$ (lithium amide), LiH (lithium hydride), LiC$_2$H$_5$S (lithium thioethoxide), LiCH$_3$O (lithium ethoxide), LiC$_2$H$_6$N (lithium dimethylamide), LiC$_6$H$_5$O (lithium phenoxide), LiC$_6$H$_5$S (lithium thiophenolate), Li$_3$N (lithium nitride), LiN$_3$ (lithium azide), LiC$_3$H$_7$O (lithium isopropoxide), Li$_2$C$_8$H$_4$O$_4$ (dilithium terephthalate), Li$_2$C$_6$O$_6$(dilithium rhodizonate), LiC$_{16}$H$_8$O$_6$ (lithium dicarboxylate anthraquinone), Li$_2$C$_6$H$_4$O$_4$(dilithium dihydroxybenzoquinone), and LiC$_{22}$H$_{24}$N$_4$O$_4$ (lithium naphthalenediimide), among others.

The metal oxide of the cathode active material may be described by the empirical formula M"$_x$O$_y$, where M' is a metal that may be the same or different than M of the metal compound, and where x and y are each positive nonzero real numbers, which may be the same or different. The metal oxide may be, or include, a metal superoxide, a metal superoxide radical, and/or a metal peroxide.

M and M", which may be the same or different, may be selected from lithium, sodium, potassium, beryllium, magnesium, calcium, vanadium, iron, nickel, copper, zinc, and aluminum.

The resulting cathode active material may include at least a portion of the metal compound and at least portion of the metal oxide that, considered in combination, form a cluster. In one aspect of the disclosure, the resulting cluster may be described by the empirical formula M$_a$M'$_b$R$_c$O$_d$, where each of a, b, c, and d are positive nonzero real numbers, which may be the same or different.

The resulting cathode active material composition may include a ratio of metal compound:metal oxide that may vary from 5:95 to 75:25 by weight. The composition ratio of M$_a$R$_b$:M'xOy may be about 10:90, 15:85, 20:80, 25:75, 30:70, 35:65, 40:60, 45:55, 50:50, 55:45, 60:40, 65:35, 70:30, or 75:25. Typically, the cathode active material is at least 25 wt % metal oxide. Preferably, the cathode active material is at least about 50 wt % metal oxide. More preferably, the cathode active material is at least about 75 wt % metal oxide.

The average particle size of the cathode active material may vary from about 5 nm to about 50 μm, exhibiting an average pore size of about 0.1 nm to about 1 μm. Typically, the average particle size of the cathode active material is less than about 50 μm. Preferably, the average particle size of the cathode active material is greater than about 500 nm and less than about 50 μm. More preferably, the average particle size of the cathode active material is greater than about 5 μm and less than about 50 μm. Typically, the average pore size of the cathode active material is less than about 1 μm. Preferably, the average pore size of the cathode active material is greater than about 1 nm and less than about 500 nm. More preferably, the average pore size of the cathode active material is greater than about 5 nm and less than about 200 nm.

In some embodiments, the cathode active material is at least partially enclosed by a coating layer at an outer surface. The coating layer may vary from about 1 nm to about 1 μm in thickness. Preferably, the thickness of the coating layer is about 2 nm to about 500 nm. More preferably, the thickness of the coating layer is about 5 nm to about 200 nm. When present, the coating layer may include carbon and oxygen.

High-Energy Cathodes

Figure 2:
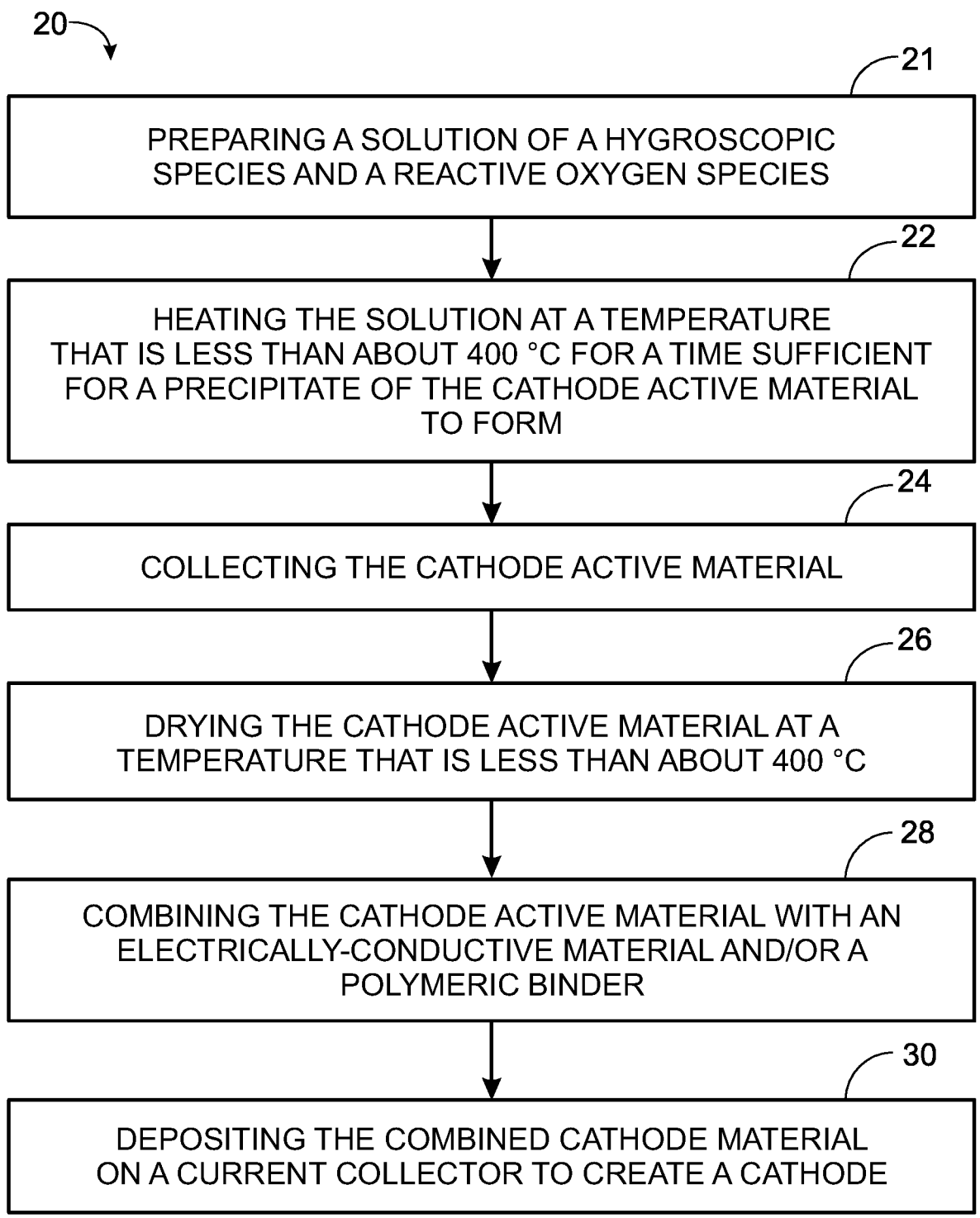
FIG. 2 is a flowchart of an illustrative method of manufacturing a cathode according to the present disclosure.

The cathode active materials disclosed herein can be used to prepare high-energy cathodes, as set out in flowchart 20 of FIG. 2. As shown, the method of manufacturing a cathode for use in a battery includes preparing a solution of a hygroscopic species and a reactive oxygen species, at step 21 of flowchart 20; heating the solution at a temperature that is less than about 400° C. for a time sufficient for a precipitate of the cathode active material to form, at step 22 of flowchart 20; collecting the cathode active material, at step 24 of flowchart 20; drying the collected cathode active material at a temperature that is less than about 400° C., at step 26 of flowchart 20; combining the collected cathode active material with one or more of an electrically-conductive material, a polymeric binder, a plasticizer, and a carboxylic acid, at step 28 of flowchart 20; and depositing the combined cathode material on a current collector to create the cathode, at step 30 of flowchart 20.

Steps 21, 22, 24, and 26 of flowchart 20 are directly analogous to corresponding steps 12, 14, 16, and 18 of flowchart 10, as described above.

As set out in step 28 of flowchart 20, the cathode active material can be combined with one or more of an electrically-conductive material, a polymeric binder, a plasticizer, and a carboxylic acid. Typically, the cathode active material is combined with an electrically-conductive material. Additionally, the cathode active material may be further combined with one or more of a polymeric binder, a plasticizer, and a carboxylic acid.

Where the cathode includes an electrically-conductive material, it can be added to one of the hygroscopic species or reactive oxygen species prior to preparation of the cathode active material, or the cathode active material can be combined with an electrically-conductive material after it is formed. In general, the cathode active material is in contact with the electrically-conductive material.

Where the cathode active material includes a metal compound and a metal oxide, each of the metal compound and the metal oxide are in contact with the other, and one or both the metal compound and the metal oxide are in contact with the electrically-conductive material.

Where the cathode includes the cathode active material and the electrically-conductive material, the cathode composition may include a ratio of the cathode active material:electrically-conductive material that may vary from 20:80 to 99:1 by weight. The composition ratio of cathode active material:electrically-conductive material may be about 20:80, 25:75, 30:70, 35:65, 40:60, 45:55, 50:50, 55:45, 60:40, 65:35, 70:30, 75:25, 80:20, 85:15, 90:10, 95:5, 96:4, 97:3, 98:2, 99:1. Typically, the cathode composition is at least 20 wt. % cathode active material. Preferably, the cathode composition may be at least 40 wt. % cathode active material. More preferably, the cathode composition may be at least 60 wt. % cathode active material.

Any electrically-conductive material that facilitates the performance of the resulting cathode is a suitable electrically-conductive material for the purposes of the present disclosure. In some embodiments, the electrically-conductive material includes a porous carbon material that is, or includes, one or more of carbon black, carbon nanotubes, carbon nanofibers, carbon dots, activated carbon, amorphous carbon, microporous carbon, mesoporous carbon, porous carbon, graphite, graphene, graphene oxide, reduced graphene oxide, graphene nanoribbons, nitrogen-doped carbon, nitrogen-doped graphene, and nitrogen-doped graphene oxide. The electrically-conductive material can have any suitable and compatible physical form, such as particles, powders, paper, foam, fibers, sheets, discs, rods, foils, or any combination thereof. Where cathode includes a porous carbon material, carbon nanotubes and/or carbon nanofibers, and carbon nanotube is particularly preferred due to its high aspect ratio and durability.

In one embodiment, the electrically-conductive material includes a porous carbon material having particles with an average particle size or diameter of about 5 nm to about 50 μm, and exhibiting an average pore size of about 0.1 nm to about 1 μm. Typically, the average particle size or diameter of the electrically-conductive material is less than about 50 μm. Preferably, the average particle size of the electrically-conductive material is greater than about 50 nm and less than about 50 μm. More preferably, the average particle size of the electrically-conductive material is greater than about 500 nm and less than about 50 μm. Typically, the average pore size of the electrically-conductive material is less than about 1 μm. Preferably, the average pore size of the electrically-conductive material is greater than about 1 nm and less than about 500 nm. More preferably, the average pore size of the electrically-conductive material is greater than about 5 nm and less than about 200 nm.

In some embodiments, the average particle size or diameter of the cathode active materials and the electrically-conductive materials are inversely correlated. In such embodiments, when the average particle size of the cathode active material is in the range of about 10 μm to about 50 μm, that of the electrically conductive material can be about 10 nm to about 50 nm, vice versa. Typically, one or more of the cathode active materials and the electrically-conductive materials include particles with an average particle size or diameter of greater than about 50 nm and less than about 50 μm, preferably greater than about 500 nm and less than about 50 μm, more preferably greater than about 1 μm and less than about 30 μm.

In one embodiment, the step of combining the cathode active material with an electrically-conductive material includes combining the cathode active material with a porous carbon material. The porous carbon material is optionally doped with one or more heteroatoms selected from boron, oxygen, nitrogen, sulfur, phosphorous, fluorine, chlorine, and bromine. Cathodes including a porous carbon material doped with nitrogen and/or fluorine are preferred, and nitrogen is particularly preferred as they permit lower charge transfer resistances. When present, the porous carbon material may include one or more of carbon black, carbon nanotubes, carbon nanofibers, carbon dots, activated carbon, graphite, graphene, graphene oxide, and graphene nanoribbons.

Any suitable electrically-conductive material may be used for the presently disclosed cathodes, which may have the same or different formulation. Cathode active material and/or electrically-conductive material may be shaped into a planar surface, and/or be a particulate solid. Where cathode active material, an electrically-conductive material, and/or electrolyte is particulate, the particles may have any suitable shape, including spherical, cubic, cuboid, conic, pyramidal, cylindrical, rectangular prismatic, hexagonal prismatic, hemispherical, triangular prismatic, pentagonal prismatic, octagonal prismatic, toroidal, octahedral, and dodecahedral, among others.

Where the cathode includes a polymeric binder, it can be added to one of the hygroscopic species or reactive oxygen species prior to preparation of the cathode active material, or the cathode active material can be combined with a polymeric binder after it is formed.

The polymeric binder can be added in order to help form a solid cathode from the cathode active material. An appropriate polymeric binder for the purposes of this disclosure can include one or more of polycaprolactone, poly(acrylic acid), poly(methyl methacrylate), polytetrafluoroethylene, poly(vinylidene fluoride), polyacrylonitrile, poly(ethylene terephthalate), polyvinylpyrrolidone, poly(4-vinylpyridine), polyvinyl chloride, polyvinyl alcohol, polyvinyl acetate, polyethylene, polypropylene, polylactic acid, polyvinyl butyral, polystyrene, polyurethane, polycarbonate, among others. In a particular embodiment, the polymeric binder includes one or poly(ethylene oxide) or poly(vinylidene fluoride).

Alternatively, or in addition, the cathode can incorporate a plasticizer, which can be used to make the resulting cathode softer and more flexible. The plasticizer can include one or more of succinonitrile, glutaronitrile, adiponitrile, ethylene carbonate, sulfolane, 3-methyl-2-oxazolidinone, butylene carbonate, phthalate derivatives, trimellitates, adipates, sebacates, and maleates, among others. In a particular embodiment, the plasticizer can include succinonitrile.

Alternatively, or in addition, the cathode can incorporate one or more carboxylic acids. When present, the carboxylic acid can be a monocarboxylic acid or a polycarboxylic acid. When the carboxylic acid is a polycarboxylic acid, it is optionally oxalic acid.

As set out at step 30 of flowchart 20, the combined cathode material, including cathode active material and optionally including one or more of a conductive material, a polymeric binder, a plasticizer, and a carboxylic acid is deposited on a current collector in order to form the desired cathode.

The current collector can include any suitable and compatible conductive material. In some embodiments, the cathode current collector includes one or more metals such as alkaline earth metals, transition metals, rare earth metals, post-transition metals, and alkali metals. In some embodiments, the cathode current collector includes at least one of aluminum, aluminum alloy, nickel, nickel alloy, duplex steel, stainless steel. In one embodiment, the cathode current collector is a metallic current collector that includes a metal or metal alloy that in turn includes one or more of molybdenum, titanium, and zirconium. In an alternative embodiment, the cathode current collector is an electrically-conductive material that includes porous carbon in electrical contact with the cathode active material.

The cathode current collector can be solid or perforated. When perforated, the pore size of the cathode current collector can vary from about 500 nm to about 1 mm, with a separation distance between pores of about 10 μm to about 100 mm).

The cathode material, with additional conductive materials, polymeric binder, and plasticizers, if present, can be applied to the current collector using any suitable application technique. For example, the combined cathode material can be cast into a film and deposited onto the desired current collector.

Figure 3:
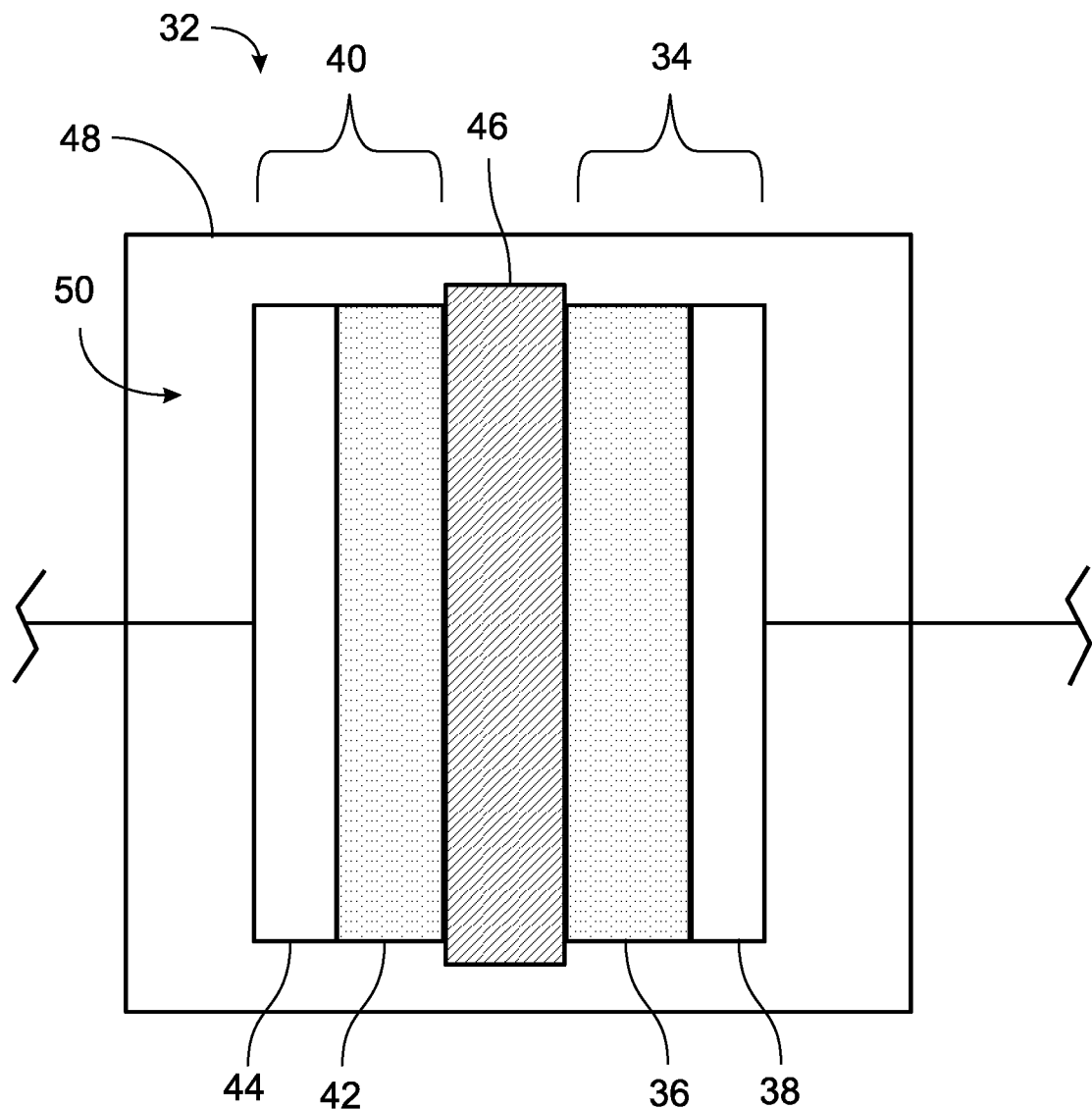
FIG. 3 is a semi-schematic diagram of an illustrative battery that includes a cathode manufactured according to the present disclosure.

The resulting cathode can be incorporated into a battery 32, as shown in FIG. 3. Battery 32 typically includes a cathode 34 according to the present disclosure. Cathode 34 can include the combined cathode material 36 as described above, including the cathode active material, applied to a cathode current collector 38. The anode 40 of battery 32 includes an anode material 42 applied to an anode current collector 44. The cathode 34 and anode 40 are typically separated by an electrolytic separator 46. The battery components are typically held within a battery case 48, which encloses the battery components, and can keep the battery components under a desired gas composition or atmosphere 50. It should be appreciated that regardless of how battery 32 is depicted herein, the batteries of the present disclosure may assume any conventional or suitable battery configuration, such as by being formed as button cells, pouch cells, prismatic cells, cylindrical cells, flow cells, in alternating plates, or in jelly rolls, among others.

Anode 40 can include an anode active material. In some embodiments, the anode includes one or more of lithium, sodium, potassium, magnesium, calcium, vanadium, aluminum, zinc, silicon, graphite, graphene, porous carbon, activated carbon, silicon compound, a metal oxide, and combinations thereof. The anode active material can be present as a coating, a foil, a mesh or screen, or other discrete anode component. Alternatively, or in addition, the anode active material can be incorporated into the anode as a component element, or component compound. In some embodiments, anode 40 includes a non-metal oxide as an anode active material. In some embodiments, the anode may include graphite. In some embodiments, the anode may include silicon, graphite, graphene, activated carbon, or a metal, or combinations thereof. Where the anode includes a metal, that metal may be an alkali metal or an alkaline earth metal. In some embodiments, the anode includes a metal oxide. In some embodiments, the anode includes a metal oxide such as $Li_4Ti_5O_{12}$, $TiO_2$, $TiNb_2O_7$, $Nb_2O_5$, $Li_3VO_4$, $H_2Ti_6O_{13}$, $LiMnBO_3$, $LiV_{0.5}Ti_{0.5}S_2$, $Li_3V_2O_5$, $Li^{3+}_xV_2O_5$, $Li_3MoO_4$, $Li_5W_2O_7$, or any combination thereof.

Anode active material 20 can be generated in situ by careful selection of the components of electrochemical cell 10, such as for example electrolyte 30 and/or additional components thereof, and optionally by the application of anode current collector 26 to electrochemical cell 10. The selection of anode active material 20 is not particularly restricted provided that the selected material can store and release ions. For example, anode active material 20 can be an alkali metal (such as lithium, sodium, and/or potassium), an alkaline earth metal (such as, magnesium and/or calcium), an amphoteric metal (such as aluminum and/or zinc), a metalloid (such as boron, germanium, arsenic, antimony, tin, tellurium, polonium, and/or silicon), a metal complex, an inorganic carbon (such as graphite, graphene, graphene oxide, reduced graphene oxide, activated carbon, carbon nanotubes, and/or carbon dots), sulfur, a sulfide (such a metal titanium disulfide $MV_{0.5}Ti_{0.5}S_2$, where M is a metal, metal sulfide ($M_2S$), metal polysulfide (e.g., $M_2S_2$, $M_2S_4$, $M_2S_6$, $M_2S_8$)), a sulfur-containing compound or material (such as a sulfate or organosulfur compound (e.g., poly (sulfur-random-(1,3-diisopropenylbenzene)), sulfurized polyacrylonitrile)), an oxide (e.g., a material of the form $M_xTi_5O_{12}$, $TiO_2$, $TiNb_2O_7$, $Nb_2O_5$, $M_xVO_4$, $H_2Ti_6O_{13}$, $M_xMnBO_3$, $M_xV_2O_5$, $M_xMoO_4$, $M_xW_2O_7$, $M'_{1-x}M''O_2$, $M'_{1-w}(M''_xM'''_y)O_2$, and/or metal titanate), an organic material or compound (e.g., truxenone, truxenone derivatives, phenoxazine, phenoxazine derivatives, phenothiazine, phenothiazine derivatives (e.g., 10-acetylphenothiazine, 10-[2-(2-methoxyethoxy)ethyl]-10H-phenothiazine), quinone, quinone derivatives (e.g., 2,2'-(2-vinylanthracene-9,10-diylidene)dimalononitrile, 2-vinylanthraquinone, anthraquinone-2,6-disulfonate, anthraquinone-1,8-disulfonate, anthraquinone-1-sulfonate, anthraquinone-1,5-disulfonic acid, 2,2'-(2-vinylanthracene-9,10-diylidene)bis(1,3-dithiole)), diamine derivatives, phenazine, phenazine derivatives, quinoxaline, quinoxaline derivatives, pyrazine, pyrazine derivatives, cyclohexane, cyclohexane derivatives, triazine, triazine derivatives, melamine, melamine derivatives, dimethoxybenzene, dimethoxybenzene derivatives, cyclopropenium derivatives, amide derivatives, amino acid, amino acid derivatives, viologen, viologen derivatives (e.g., ethylviologen), nitroxide derivatives), an organic radical (e.g., piperidine derivatives (e.g., 4-isothiocyanato-2,2,6,6-tetramethylpiperidine 1-oxyl, 4-oxo-2,2,6,6-tetramethylpiperidine 1-oxyl, 4-(2-iodoacetamido)-2,2,6,6-tetramethylpiperidine 1-oxyl, 4-amino-2,2,6,6-tetramethylpiperidine 1-oxyl, 4-methacryloyloxy-2,2,6,6-tetramethylpiperidine 1-oxyl, 2,2,6,6-tetramethylpiperidine 1-oxyl, 4-acetamido-2,2,6,6-tetramethylpiperidine 1-oxyl, 4-amino-2,2,6,6-tetramethylpiperidine 1-oxyl, 4-(2-chloroacetamido)-2,2,6,6-tetramethylpiperidine 1-oxyl, 2,2,6,6-tetramethyl-4-(2-propynyloxy)piperidine 1-oxyl, 2,2,6,6-tetramethylpiperidine 1-oxyl, 4-carboxy-2,2,6,6-tetramethylpiperidine 1-oxyl, 4-glycidyloxy-2,2,6,6-tetramethylpiperidine 1-oxyl, 4-cyano-2,2,6,6-tetramethylpiperidine 1-oxyl, 4-oxo-2,2,6,6-tetramethylpiperidine 1-oxyl, bis(2,2,6,6-tetramethyl-4-piperidyl-1-oxyl) sebacate, 4-methoxy-2,2,6,6-tetramethylpiperidine 1-oxyl), pyrrolidine derivatives (e.g., 3-carboxy-2,2,5,5-tetramethylpyrrolidine 1-oxyl, 16-DOXYL-stearic acid), imidazoline derivatives (e.g., 2-phenyl-4,4,5,5-tetramethylimidazoline-3-oxide-1-oxyl, 2-(4-nitrophenyl)-4,4,5,5-tetramethylimidazoline-3-oxide-1-oxyl), 1,1-diphenyl-2-picrylhydrazyl, galvinoxyl) or any combination thereof.

In some embodiments, an anode active material can include one or more organic materials, as described above. Where an anode active material includes an organic material, the organic material may be selected from any suitable organic compound or fragment of an organic compound, as described above. In one aspect, anode active material includes an organic compound that includes a heteroatom, such as boron, oxygen, nitrogen, sulfur, phosphorous, fluorine, chlorine, and bromine, among others. Alternatively, or in addition, anode active material can include an organic material that includes one or more aromatic groups.

The materials used as part of the cathode excluding the cathode active materials such as electrically conductive material, polymeric binder, plasticizer, carboxylic acid, can also be part of the anode. Where the anode includes an electrically-conductive material with one or more additional materials, polymeric binders, and plasticizers, the electrically-conductive material can be applied to a current collector using any suitable application technique. For example, the electrically-conductive material can be cast into a film and then deposited onto the desired current collector.

Anode 40 may include an anode material 42 that is an anode active material, where the anode active material is at least partially enclosed by a coating layer at an outer surface. The coating layer may vary from about 1 nm to about 1 μm in thickness. Preferably, the thickness of the coating layer is about 2 nm to about 500 nm. More preferably, the thickness of the coating layer is about 5 nm to about 200 nm. When present, the surface coating is optionally electrically insulating. By "electrically insulating" is meant that anode surface coating exhibits an electrical conductivity that is less than or equal to 10-3 S/cm. Preferably, anode surface coating exhibits an electrical conductivity of less than or equal to 10-5 S/cm. More preferably, anode surface coating has an electrical conductivity of less than or equal to 10-7 S/cm. In one embodiment, anode surface coating includes one or more of carbon, oxygen, nitrogen, boron, sulfur, silicon, tin, selenium, where each element may be present as a compound or complex.

Anode current collector 44 can include a metal or metal alloy, such as copper, a copper alloy, nickel, a nickel alloy, duplex steel, stainless steel, silver, a silver alloy, or any combination thereof. In some embodiments. The anode current collector 44 can be in contact with (e.g., coated with) an electrically-conductive material, such as a porous carbon material that is or includes carbon black, carbon nanotubes, carbon nanofibers, carbon dots, activated carbon, amorphous carbon, microporous carbon, mesoporous carbon, porous carbon, graphite, graphene, graphene oxide, graphene nanoribbons, nitrogen-doped carbon, nitrogen-doped graphene, nitrogen-doped graphene oxide, and combinations thereof. In some embodiments, the electrically-conductive material is in the form of particles, powders, paper, foam, fibers, sheets, discs, rods, foils, or any combination thereof.

In some embodiments, battery 32 can be a so-called "anode-free" battery, where anode 40 includes anode current collector 44, but no anode material 42. In such embodiments, anode current collector 44 may be disposed on or in the electrolyte and/or the separator such that the electrolyte and/or the separator is between cathode 34 and anode current collector 44. Alternatively, or in addition, anode current collector 44 can be or include an exterior housing of the battery (i.e., battery case 48).

Electrolytic separator 46 may be in contact with cathode 34, or separator 46 may be in contact with electrolyte. Where electrochemical cell includes an anode, separator 46 can be disposed between cathode 34 and anode 40. Separator 46 may be larger in one or both of its width and length than one or both of cathode current collector and anode current collector, in order to avoid contact between cathode 34 and anode 40, between cathode 34 and anode current collector, between cathode current collector and anode 40, or between cathode current collector and anode current collector.

Electrolytic separator 46 can be disposed between cathode 34 and anode 40, and typically includes an electrolyte to provide for ion transport within battery 32, and act as a conduit for ion transport through its interaction with the anode material 42 and the cathode material 36. Electrolytic separator 46 can be in contact with the electrolyte, and can include a polymer material, such as for example a polymer film such as polyethylene, polypropylene, poly(tetrafluoroethylene), or poly(vinyl chloride), among others. Typically, the polymer film, when present, includes polypropylene and/or polyethylene. Alternatively, or in addition, electrolytic separator 46 can include, nonwoven fibers (such as nylon, polyesters, and glass, among others), a glass, a ceramic, or any combination thereof. In some embodiments, the separator includes glass fibers. In some embodiments, the separator includes a surfactant coating or treatment to enhance the wettability of a liquid-based electrolyte.

Electrolyte 32 is a material that is capable of acting as a conduit for ion transport within electrochemical cell of battery through its interaction with the electrodes of the cell. Electrolyte 32 can be a liquid, a solid, a gel, or a liquified gas that includes an electrolyte material that is ionically conductive. Electrolyte may include an electrolytic solvent. Electrolyte may include water as the electrolytic solvent. Electrolyte material can be selected to have an ionic conductivity of greater than or equal to $10^{-10}$ S/cm and an electrical conductivity of less than or equal to $10^{-1}$ S/cm. Preferably, electrolyte material has an ionic conductivity of greater than or equal to $10^{-8}$ S/cm and an electrical conductivity of less than or equal to $10^{-3}$ S/cm. More preferably, electrolyte material has an ionic conductivity of greater than or equal to $10^{-6}$ S/cm and an electrical conductivity of less than or equal to $10^{-5}$ S/cm.

Where electrolyte 32 is present in electrochemical cell as a solid, electrolyte 32 is optionally present in the form of a film, a foil, a tape, a paper, a sheet, a layer, or the like. The solid electrolyte material can include one or more polymers, glass, phosphates, fluorophosphates, carbonates, amines, borates, fluoroborates, halides, halates, oxohalides, oxides (e.g., $MO_2$, $M_2O_3$, $M_2B_2O_5$, $M_2O$, MOH, $M_2O_2$, $M_2CO_3$, $P_2O_5$, $MPO_4$, $M_2M'_3O_7$, wherein M is a metal or metalloid), perovskites, antiperovskites (e.g., $M_3OBr$, $M_3OCl$, $M_2OHBr$, $M_2OHCl$, wherein M is a metal or metalloid), LISICON-type electrolytes (e.g., $M_{1+x}M'_xM''_{2-x}(PO_4)_3$, $M_{2+2x}M'_{1-x}M''O_4$, $M_{(3+x)}M'_xV_{(1-x)}O_4$, $M_{(4-x)}M'_{(1-x)}P_xO_4$, $M_{1+x+y}M'_xM''_{2-x}Si_yP_{3-y}O_{12}$, $M_{1+x}M'_xM''_yTi_{2-x-y}P_3O_{12}$, $M_{1+x+3y}M'_xM''_{2-x}(Si_yPO_4)_3$, $M_{14}M'M''_4O_{16}$, $M_{4-x}M'_xV_xO_4$, wherein M is a metal or metalloid), garnets (e.g., $M_7M'_3M''_2O_{12}$, $M_{7-x}M'_3M''_{2-x}Nb_xO_{12}$, $M_7M'_{3-x}M''_xZr_{2-x}Nb_xO_{12}$, $M_{6+x}M'_3M'''_{1+x}Ta_{1-x}O_{12}$, wherein M is a metal or metalloid), sulfides (e.g., $M_6PS_5Cl$, $M_{9.54}M'_{1.74}P_{1.44}S_{11.7}Cl_{0.3}$, $M_{10}M'P_2S_{12}$, $M_7PS_6$, $M_7P_3S_{11}$, $M_{3.25}P_{0.95}S_4$, $M_{3+x}M'_xP_{1-x}S_4$, wherein M is a metal or metalloid), thio-LISICON type electrolytes (e.g., $M_{(4-x)}M'_{(1-x)}P_xS_4$, wherein M is a metal or metalloid), oxynitrides, nitrides, or the like (LISICON is an acronym for Lithium Super Ionic CONductor).

Where electrolyte 32 is present in electrochemical cell as a solid, electrolyte 32 is optionally present as a composition of solid particles. An average particle size of an appropriate electrolyte material may vary from about 5 nm to about 30 μm, and may exhibit an average pore size of about 0.1 nm to about 500 nm. Typically, the average particle size or diameter of an appropriate electrolyte material is less than about 30 μm. Preferably, the average particle size of the electrolyte material is greater than about 10 nm and less than about 20 μm. More preferably, the average particle size of the electrolyte material is greater than about 20 nm and less than about 10 μm. Where electrolyte 30 is present as a composition of solid particles, an average pore size of the electrolyte material may be less than about 500 nm. Preferably, the average pore size of the electrolyte material is greater than about 0.5 nm and less than about 200 nm. More preferably, the average pore size of the electrolyte material is greater than about 1 nm and less than about 100 nm.

Where electrolyte 32 includes a liquified gas, the liquified gas can include one or more of a methane (e.g., methane, fluoromethane, difluoromethane), an ethane (e.g., ethane, fluoroethane, 1,1-difluoroethane, 1,1,1,2-tetrafluoroethane), a propane (e.g., propane, 2-fluoropropane), a butane (e.g., butane, fluorobutane), an ethylene, an acetylene, a propylene, carbon monoxide, and carbon dioxide. The liquified gas may be produced from a gas at or below the condensation temperature of the gas at the critical pressure or at or above the vapor pressure of the gas at the critical temperature.

Where electrolyte 32 includes an organic liquid, the organic liquid can include one or more organic carbonates, ethers, esters, amides, halogenated liquids, nitriles, or ionic liquids.

Where electrolyte 32 includes an organic carbonate, the organic carbonate can be, for example, propylene carbonate, dimethyl carbonate, diethyl carbonate, ethyl methyl carbonate, ethylene carbonate, vinylene carbonate, fluoroethylene carbonate, dipropyl carbonate, 4-vinyl-1,3-dioxolan-2-one, 4-chloro-1,3-dioxolan-2-one, diethyl 2,5-dioxahexanedioate, bis(2,2,2-trifluoroethyl) carbonate, 4-fluoro-1,3-dioxolan-2-one, dimethyl 2,5-dioxahexanedioate, or dibutyl carbonate, among others.

Where electrolyte 32 includes an ether, the ether can be, for example, dimethoxyethane, dimethoxymethane, diethyl ether, diethyl ether, ethylene glycol, ethylene glycol derivatives (diglyme, triglyme, tetraglyme), tetrahydrofuran, dioxolane, or dioxane, among others.

Where electrolyte 32 includes an ester, the ester can be, for example, triethyl borate, trimethyl borate, tris(2,2,2-trifluoroethyl) borate, 2,4,6-trimethoxyboroxin, tributyl borate, trihexyl borate, or tripropyl borate, among others.

Where electrolyte 32 includes an amide, the amide can be, for example, dimethylformamide, diethylformamide, dimethylacetamide, diethylacetamide, dimethylpropionamide, diethylpropionamide, 2,2,2-trifluorodimethylacetamide or dipropylacetamide, among others.

Where electrolyte 32 includes a halogenated liquid, the halogenated liquid may include, for example, a chlorinated liquid (such as dichloromethane), or a fluorinated liquid (such as, for example, fluoroethylene carbonate, 1,1,2,2-tetrafluoroethyl 2,2,2-trifluoroethyl ether, difluoromethyl 2,2,3,3-tetrafluoropropyl ether, methyl 2,2,3,3,3-pentafluoropropyl ether, methyl 1,1,2,2-tetrafluoroethyl ether, bis(2,2,2-trifluoroethyl) ether, 1,1,2,3,3,3-hexafluoropropyl methyl ether, or ethyl 1,1,2,2-tetrafluoroethyl ether).

Where electrolyte 32 includes a solvent that is a nitrile, the nitrile may include, for example, acetonitrile, propionitrile, methoxyacetonitrile, 3-methoxypropionitrile, succinonitrile, glutaronitrile, adiponitrile, tetracyanoethylene, 3,3'-oxydipropionitrile, 3-ethoxypropionitrile, 1,3,6-hexanetricarbonitrile, 1,2,2,3-propanetetracarbonitrile, malononitrile, fumaronitrile, valeronitrile, acrylonitrile, tolunitrile, methoxybenzonitrile, or 3-butoxypropionitrile, among others.

Where electrolyte 32 includes an ionic liquid, the ionic liquid can be, for example, an imidazolium derivative (such as, for example, 1-ethyl-3-methylimidazolium hexafluorophosphate, 1-ethyl-3-methylimidazolium tetrafluoroborate, 1-ethyl-2,3-dimethylimidazolium bis(trifluoro-methanesulfonyl)imide, 1-ethyl-3-methylimidazolium bis(trifluoromethanesulfonyl)imide, 2,3-dimethyl-1-propylimidazolium bis(trifluoro-methanesulfonyl)imide, 1-decyl-3-methyl-imidazolium tetrafluoroborate, 1-decyl-3-methylimidazolium bis(trifluoro-methanesulfonyl)imide, 1,3-dimethylimidazolium bis(trifluoromethanesulfonyl)imide, 1-dodecyl-3-methylimidazolium bis(trifluoro-methanesulfonyl)imide, 1-ethyl-3-methyl-imidazolium nitrate, 1-ethyl-3-methyl-imidazolium trifluoromethanesulfonate, 1-vinylimidazole bis(trifluoromethanesulfonyl)imide, 1-allyl-3-methylimidazolium bis(trifluoromethanesulfonyl)imide, 1-methyl-3-n-octylimidazolium trifluoro-methanesulfonate, 3-ethyl-1-vinylimidazolium bis(trifluoromethanesulfonyl)imide, 1-methyl-3-n-octylimidazolium tetrafluoroborate, 1-butyl-2,3-dimethylimidazolium tetrafluoro-borate, 1-butyl-2,3-dimethylimidazolium hexafluorophosphate, 1-butyl-3-methyl-imidazolium tetrafluoroborate, 1-butyl-3-methylimidazolium methanesulfonate, 1-butyl-3-methylimidazolium bis(trifluoromethanesulfonyl)imide, 1-butyl-3-methyl-imidazolium hexafluorophosphate, 1-butyl-2,3-dimethylimidazolium trifluoro-methanesulfonate, 1-ethyl-3-methylimidazolium methane-sulfonate, 1-butyl-3-methylimidazolium trifluoromethanesulfonate, 1-butyl-2,3-dimethyl-imidazolium bis(trifluoromethanesulfonyl)imide, 1-methyl-3-(4-sulfobutyl)imidazolium bis(tri-fluoromethanesulfonyl)imide, 1-methylimidazole bis(trifluoromethanesulfonyl)imide, 1-methyl-1H-imidazol-3-ium hexafluorophosphate, or 3,3'-(butane-1,4-diyl)bis(1-vinyl-3-imidazolium) bis(trifluoromethanesulfonyl)imide), among others.

Where electrolyte 32 includes an ionic liquid, the ionic liquid can be, for example, a pyrrolidinium derivative, (such as, for example, 1-butyl-1-methylpyrrolidinium trifluoromethanesulfonate, 1-butyl-1-methylpyrrolidinium hexafluorophosphate, 1-methyl-1-pentylpyrrolidinium bis(trifluoromethanesulfonyl)imide, 1-methyl-1-propylpyrrolidinium, bis(trifluoromethanesulfonyl)imide, 1-butyl-1-methylpyrrolidinium bis(trifluoro-methanesulfonyl) imide, 1-ethyl-1-methylpyrrolidinium tetrafluoroborate, or 1-allyl-1-methylpyrrolidinium bis(trifluoromethanesulfonyl)imide, among others).

Where electrolyte 32 includes an ionic liquid, the ionic liquid can be, for example, a pyridinium derivative (such as, for example, 1-butyl-4-methylpyridinium hexafluorophosphate, 1-butyl-4-methylpyridinium bis(trifluoro-methanesulfonyl)imide, 1-hexylpyridinium hexafluorophosphate, 1-ethyl-3-(hydroxymethyl)pyridinium ethyl sulfate, 1-butylpyridinium tetrafluoroborate, 1-butylpyridinium hexafluorophosphate, 1-butyl-4-methylpyridinium hexafluorophosphate, 1-butylpyridinium tetrafluoroborate, 1-butylpyridinium hexafluorophosphate, 1-butyl-4-methylpyridinium tetrafluoroborate, 1-ethyl-3-methylpyridinium bis(trifluoro-methanesulfonyl)imide, 1-ethyl-3-methylpyridinium ethyl sulfate, 1-methylpyridinium bis(trifluoromethanesulfonyl)imide, or 1,1'-bis[3-(trimethylammonio)propyl]-4,4'-bipyridinium, among others).

Where electrolyte 32 includes an ionic liquid, the ionic liquid can be, for example, a piperidinium derivative such as, for example, 1-butyl-1-methylpiperidinium bis(trifluoromethanesulfonyl)imide, or 1-methyl-1-propylpiperidinium bis(fluorosulfonyl)-imide, among others.

Where electrolyte 32 includes an ionic liquid, the ionic liquid can be, for example, an ammonium derivative such as, for example, methyltri-n-octylammonium bis(trifluoromethane sulfonyl)imide, ethyl(3-methoxypropyl)dimethylammonium bis(trifluoro-methanesulfonyl)imide, ethyl(2-methoxyethyl)dimethylammonium bis(trifluoromethanesulfonyl)imide, butyltrimethyl ammonium bis(trifluoromethane-sulfonyl)imide, tetrabutyl-ammonium trifluoromethanesulfonate, methyltri-n-octylammonium bis(trifluoro-methane-sulfonyl)imide, trimethyl-propylammonium bis(trifluoromethanesulfonyl)imide, tributyl-methyl-ammonium bis(trifluoromethane sulfonyl)imide, butyltrimethylammonium bis(trifluoro-methanesulfonyl)imide, or tetrabutyl ammonium hexafluorophosphate, among others.

Where electrolyte 32 includes an ionic liquid, the ionic liquid can be, for example, a phosphonium derivative such as, for example tributylmethylphosphonium bis(trifluoromethanesulfonyl)imide, tributyl(2-methoxyethyl)-phosphonium bis(trifluoro-methane-sulfonyl)imide, tetrabutylphosphonium tetrafluoroborate, tetrabutylphosphonium hexafluorophosphate, or tributylmethyl-phosphonium bis(trifluoromethane-sulfonyl)imide, among others.

Where electrolyte 32 includes an ionic liquid, the ionic liquid can be, for example, a morpholinium derivative, or a sulfonium derivative (such as, for example, triethylsulfonium bis(trifluoromethanesulfonyl)imide)).

Where electrolyte 32 is present in electrochemical cell 10 as a solution that includes a solvent and a solute dissolved in the solvent, the solute may include one or more ionic metal complexes, such as, for example, bis(nonafluorobutanesulfonyl)imide, metal (fluorosulfonyl) (trifluoro-methanesulfonyl)imide, metal trifluoromethanesulfonate, metal tetrafluoroborate, metal hexafluorophosphate, metal bis (fluorosulfonyl)imide, metal nonafluoro-1-butanesulfonate, metal bis(trifluoromethane sulfonyl)imide, metal tricyanomethanide, metal nitrates, metal halides, metal bis(oxalato)borate, metal difluoro(oxalato)borate, or metal perchlorate, among others.

Electrolyte 32 may optionally include one or more additives, where the additives can be polymeric materials, plasticizers, phosphazenes, phosphates, sulfonyls, and carboxylic acids. When present, the polymeric material can include, for example, one or more of polycaprolactone, poly(acrylic acid), poly(methyl methacrylate), polytetrafluoroethylene, poly(vinylidene fluoride), polyacrylonitrile, poly(ethylene terephthalate), polyvinylpyrrolidone, poly(4-vinylpyridine), polyvinyl chloride, polyvinyl alcohol, polyvinyl acetate, polyethylene, polypropylene, polylactic acid, polyvinyl butyral, polystyrene, polyurethane, polycarbonate, styrene-butadiene-rubber, sodium carboxymethyl cellulose, in any combination. In one embodiment, the polymeric material includes one of poly(ethylene oxide) or poly(vinylidene fluoride), among others.

Where the additive includes a plasticizer, the plasticizer can include, for example, succinonitrile, glutaronitrile, adiponitrile, ethylene carbonate, propylene carbonate, dimethyl sulfoxide, γ-butyrolactone, sulfolane, 3-methyl-2-oxazolidinone, butylene carbonate, phthalate derivatives, trimellitates, adipates, sebacates, maleates, or any combination thereof, among others.

Where the additive includes a phosphazene, the phosphazene can include, for example, one or more of pentafluoro (phenoxy)cyclotriphosphazene, phosphonitrilic chloride trimer, ethoxy(pentafluoro)cyclotriphosphazene, hexaphenoxycyclo-triphosphazene, or hexafluorocyclotriphosphazene, among others.

Where the additive includes a phosphate, the phosphate may include, for example, one or more of tris(1,1,1,3,3,3-hexafluoro-2-propyl) phosphate, tris(2-butoxyethyl) phosphate, tris(2-ethylhexyl) phosphate, tris(1H,1H,5H-octafluoropentyl) phosphate, 2-ethylhexyl diphenyl phosphate, triamyl phosphate, tri-o-cresyl phosphate, triallyl phosphate, tri-m-cresyl phosphate, triethyl phosphate, tri-p-cresyl phosphate, triphenyl phosphate, trimethyl phosphate, tris(2,2,2-trifluoroethyl) phosphate.

Where the additive includes a sulfonyl, the sulfonyl may include, for example, one or more of isopropyl methyl sulfone, dimethyl sulfone, dimethyl sulfite, dipropyl sulfone, 1,3-propanesultone, 3-methylsulfolane, 1,4-butanesultone, tetrahydrothiophene 1,1-dioxide, 1,3,2-dioxathiolane 2,2-dioxide, 1,3,2-dioxathiolane 2-oxide.

Where the additive includes a carboxylic acid, the carboxylic acid may be, for example, a monocarboxylic acid or a polycarboxylic acid. When the carboxylic acid is a polycarboxylic acid, it may be oxalic acid. When present, the carboxylic acid may be present in the electrolyte at a weight percentage of between about 0.01 wt. % and about 30 wt. %, preferably between about 0.1 wt. % and about 20 wt. %, more preferably between about 1 wt. % and about 10 wt. %.

Where electrolyte 32 is or includes a gel, the gel is typically obtained by mixing an appropriate liquid electrolyte material (as described above) with an appropriate solid electrolyte material (as described above). By appropriate is meant that the liquid and solid electrolyte materials are physically and chemically compatible, and that when mixed together in a selected ratio an electrolyte gel can be obtained that exhibits the desired consistency and electrolytic properties.

Electrolyte 32 preferably includes a liquid, a liquified gas, and/or a gel as discharge product 28 is typically more readily dissolved in such electrolytes. In one embodiment, electrolyte 30 includes a solvent having a molecular weight that is less than about 300 g/mol, preferably less than about 200 g/mol, and more preferably less than about 100 g/mol, solvents having a smaller molecular weight can lead to a higher energy density for the resulting electrochemical cell. For instance, water has a molecular weight of 18.01 g/mol, dimethylacetamide 87.12 g/mol, dimethoxyethane 90.12 g/mol, dimethyl carbonate 90.08 g/mol, ethylene carbonate 88.06 g/mol, dioxolane 74.08 g/mol.

In some embodiments, the battery 32 can be called "single-material" battery, where the cathode active materials disclosed herein can also be used as the electrolyte and/or the separator. In such embodiments, the cathode active materials that are not in contact with the electrically-conductive materials or the current collector function as the electrolyte and/or the separator.

Where the battery includes the cathode and the electrolyte, its composition may include a ratio of the cathode: electrolyte that may vary from 15:85 to 95:5 by weight. The composition ratio of the cathode:electrolyte may be about 15:85, 20:80, 25:75, 30:70, 35:65, 40:60, 45:55, 50:50, 55:45, 60:40, 65:35, 70:30, 75:25, 80:20, 85:15, 90:10, 95:5. Typically, the cathode electrolyte ratio is at least 15 wt % cathode. Preferably, the cathode electrolyte ratio is at least 30 wt % cathode. More preferably, the cathode electrolyte ratio is at least 45 wt % cathode.

In addition, the electrolyte of electrolytic separator 46 and/or atmosphere 50 can include a greenhouse gas. When present in the electrolyte, the greenhouse gas can be dissolved or liquified greenhouse gas. The term "greenhouse gas" typically refers to a gas that absorbs and emits radiant energy within the thermal infrared range. Non-exclusive examples of greenhouse gases include carbon dioxide ($CO_2$), methane ($CH_4$), nitrous oxide ($N_2O$), ozone ($O_3$), sulfur hexafluoride ($SF_6$), nitrogen trifluoride ($NF_3$), hydrofluorocarbons, chlorofluorocarbons, and perfluorocarbons, among others. Where a greenhouse gas is a halocarbon compound, it may include, for example, carbon tetrachloride ($CCl_4$), tetrafluoromethane ($CF_4$), or hexafluoroethane ($C_2F_6$), among others.

Where a greenhouse gas is dissolved in a liquid electrolyte, the greenhouse gas can be introduced via an apparatus that includes a pressure gauge, a gas inlet, a gas outlet, and a chemically resistant frit or foam submerged in the liquid electrolyte. The liquid electrolyte can be kept under a greenhouse gas atmosphere at a pressure above standard atmospheric pressure for at least 10 seconds to at least 100 seconds, or longer.

It should be appreciated that while the descriptions of the various embodiments herein are written in the context of a battery having a single cell, the same or similar principles may be applied to a battery assembly that includes more than one battery cell (i.e., battery packs, etc.). Such multiple-battery assemblies should be understood to fall within the scope of the present disclosure.

Example 1. Manufacture of a High-Energy Cathode

Cathodes according to the present disclosure are manufactured and tested using the following procedures.

Lithium hydroxide (LiOH) monohydrate and lithium chloride (LiCl) hydrate are dissolved in a 1:4 oxalic acid (OA)-methanol (MeOH) mixture with vigorous stirring to prepare a 0.1 M LiOH/0.1 M LiCl solution. 100 mg of carbon nanotube (CNT) is added to the solution with stirring, and the resulting mixture was ultrasonicated for 10 minutes to cause the carbon nanotube to interweave. A solution of hydrogen peroxide ($H_2O_2$) and carbamide peroxide ($CH_6N_2O_3$) was added dropwise to the reaction mixture at a temperature of 65° C., with vigorous stirring. The molar ratio of the components of the reaction mixture was $H_2O_2:CH_6N_2O_3:LiOH:LiCl=1:1:1:1$.

The reaction mixture is then transferred to a TEFLON-lined stainless-steel autoclave and heated to 130° C. for 12 hours. The resulting precipitate is separated from the mother liquor by filtration, washed with acetone and dried under vacuum at 110° C. for 24 hours. The collected material is then quickly transferred to an argon-filled glovebox with minimal exposure to air, and mixed with porous carbon, succinonitrile as a plasticizer, and polytetrafluoroethylene as a polymeric binder. The resulting mixture is cast onto a 316L stainless-steel mesh current collector, with a wire diameter of 0.05 mm and apertures of 0.08 mm to yield the high-energy cathode.

The prepared cathode is placed in a coin cell (CR2032) with lithium metal foil as an anode and a polypropylene separator wetted with an electrolyte solution of 0.5 M bistrifluoro-methanesulfonimidate (LiTFSI)/0.5 M lithium nitrate ($LiNO_3$) in FEC-DMAC (1:1 volume ratio). The electrolyte solution was stored for 7 days under $CO_2$ atmosphere at above 5 bar of pressure before use.

Example 2. Determining the Charge-Discharge Profile of the High-Energy Battery

Figure 4:
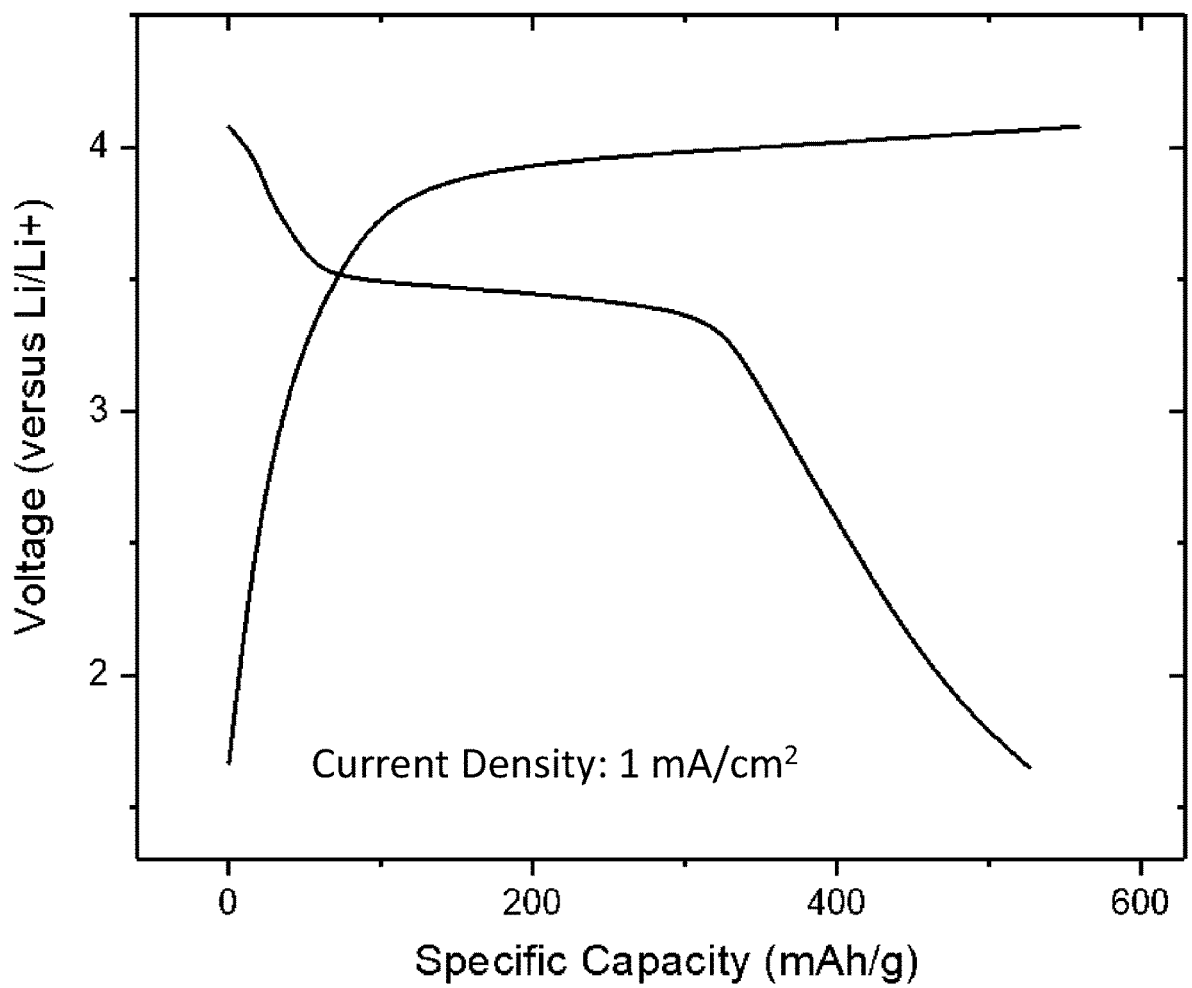
FIG. 4 is a plot demonstrating the high specific capacity and high voltage performance of an illustrative battery that incorporates cathode active material according to the present disclosure, as described in Example 2.

The high-energy battery prepared in Example 1 is subjected to cyclic charge-discharge by applying constant current to the battery. The high capacity performance of the battery is demonstrated in the plot of FIG. 4, which is a plot of charge discharge profile with voltage (V versus Li/Li+) versus specific capacity (mAh/g).

As shown, the battery of Example 1 achieves a specific capacity of over 500 mAh/g based on the weight of the cathode active material at a current density of 1 mA/cm2. The plot also demonstrates a high operating average discharge voltage of 3.41 V with a clear discharge plateau at around 3.48 V. Furthermore, the absence of any indication of an oxygen reduction reaction at around 2.5 V shows that the cathode active material does not evolve gaseous oxygen during charging.

Example 3. Determining the Rechargeability of the High-Energy Battery

Figure 5:
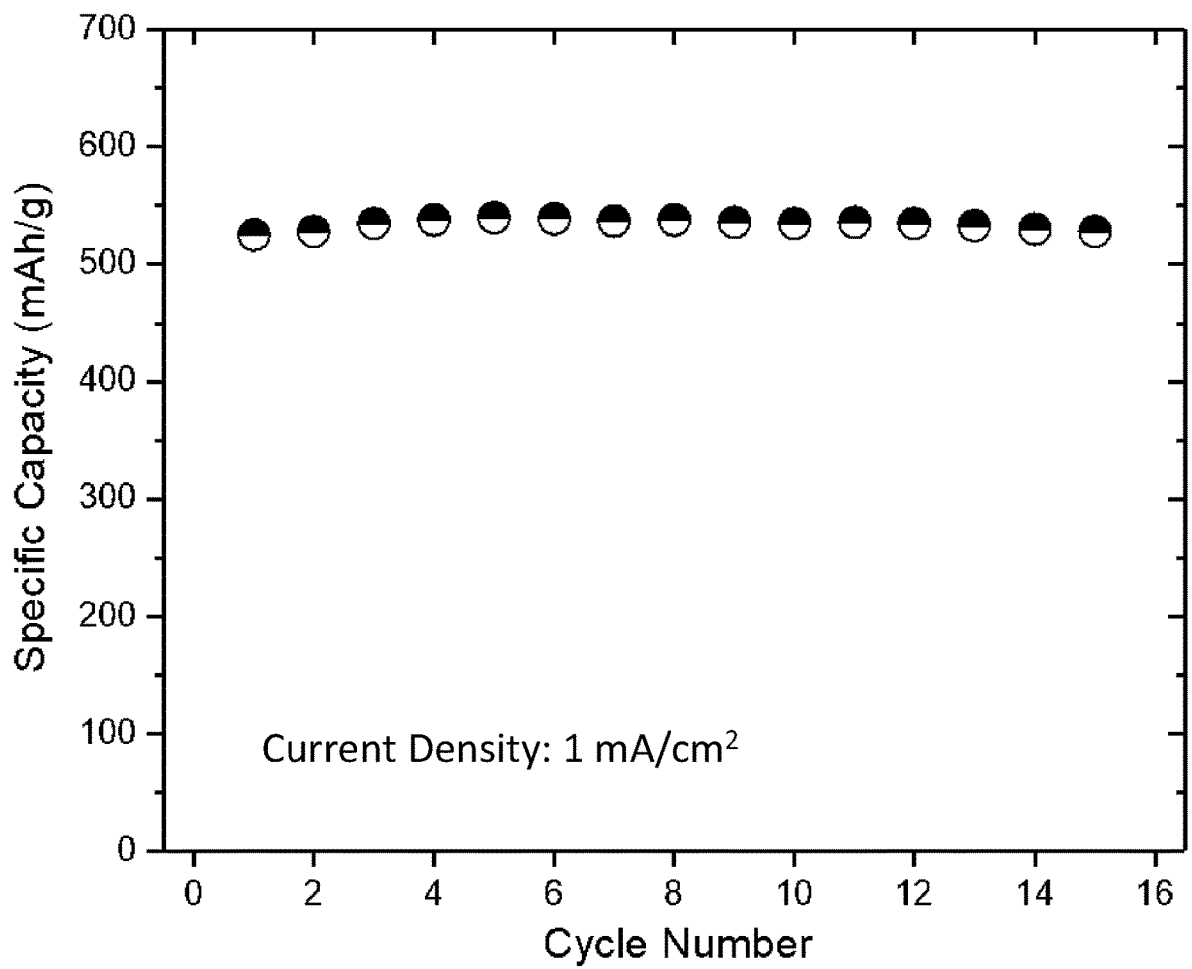
FIG. 5 is a plot demonstrating the advantageously high rechargeability of an illustrative battery that incorporates cathode active material according to the present disclosure, as described in Example 3.

The high-energy battery prepared in Example 1 is subjected to repeated discharge and recharge. As shown in FIG. 5, the battery maintained a high capacity over 15 cycles at a current density of 1 mA/cm2.

Example 4. Specific Capacity Comparison

Figure 6:
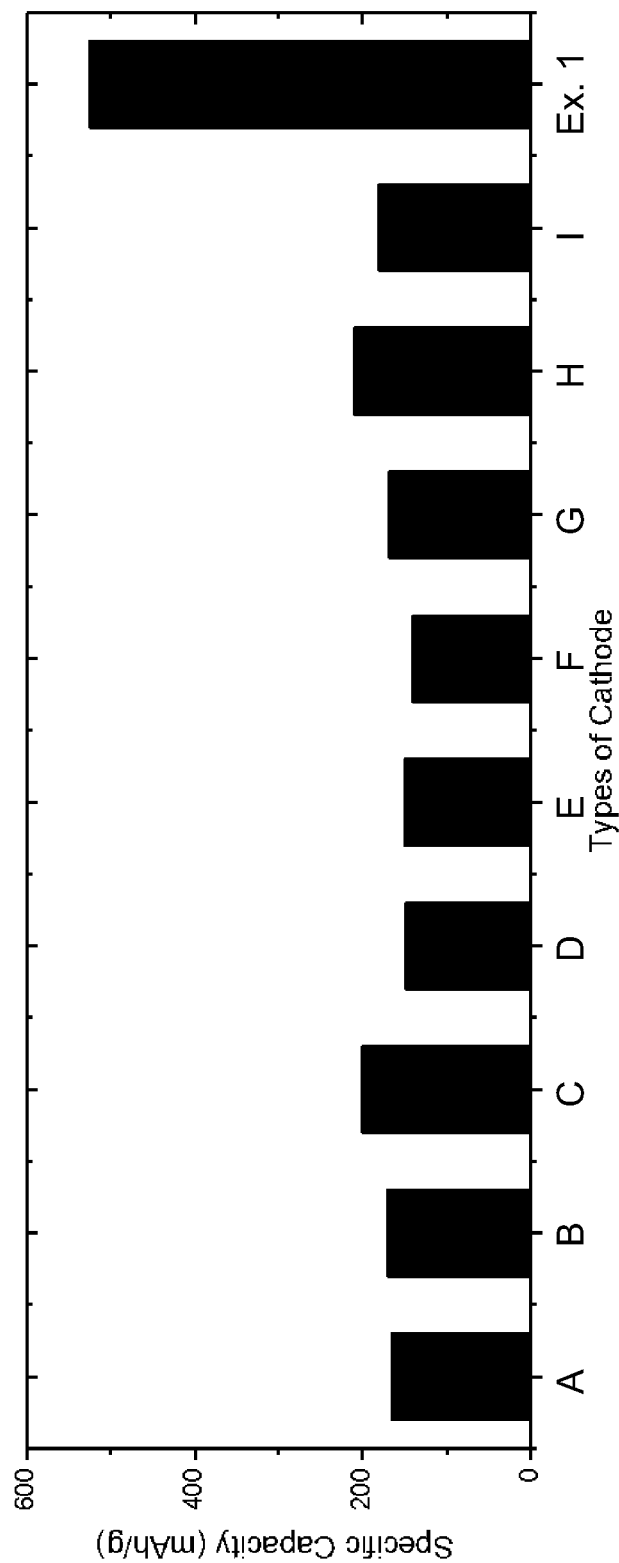
FIG. 6 is a bar graph comparing the specific capacities of selected battery cathode materials in comparison with a cathode prepared according to the present disclosure, as described in Example 4.

The specific capacity of the cathode materials prepared in Example 1 is compared to the specific capacities of conventional lithium-ion batteries with metal oxide cathodes. As shown in FIG. 6, as cathode prepared as in Example 1 exhibits a higher practical specific capacity than conventional lithium-ion batteries with metal oxide cathodes selected from LiFePO4 (A), $LiNi_xMn_yAl_zO_2$ (B), $LiNi_xCo_y$-$Al_zO_2$ (C), $LiCoO_2$ (D), $LiNiO_2$ (E), $LiMnO_2$ (F), $LiMnPO_4$ (G), $LiTiS_2$ (H), and $Li_2MnO_3$ (I) (values for conventional battery compositions shown in the graph taken from publicly-available literature (see https://doi.org/10.1016/j.mattod.2014.10.040).

Example 5. Additional Selected Embodiments

This section describes additional aspects and features of the disclosed cathode active materials, cathodes, and batteries presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. A cathode active material, comprising: a metal compound having an empirical formula of $M_aR_b$, wherein M is a metal; R is an atom, a molecule, or a radical; and a and b are independently positive nonzero real numbers; and a metal oxide having an empirical formula of $M'_xO_y$, wherein M' is a metal, and x and y are independently positive nonzero real numbers; wherein the metal compound and the metal oxide are in contact.

A2. The cathode active material of paragraph A1, wherein M and M' may be the same or different, and are selected from lithium, sodium, potassium, beryllium, magnesium, calcium, vanadium, iron, nickel, copper, zinc, and aluminum.

A3. The cathode active material of paragraph A1, wherein at least a portion of the metal compound and a portion of the metal oxide in combination form a cluster having an empirical formula of $M_aM'_bR_cO_d$, where each of a, b, c, and d are positive nonzero real numbers which may be the same or different.

A4. The cathode active material of paragraph A1, wherein each R is independently an organic moiety or a heteroatom independently selected from nitrogen, chlorine, bromine, fluorine, sulfur, phosphorous, and boron.

A5. The cathode active material of paragraph A4, wherein when R is an organic moiety, R is an organic moiety that includes one or more heteroatoms independently selected from nitrogen, chlorine, bromine, fluorine, sulfur, phosphorous, and boron.

A6. The cathode active material of paragraph A1, wherein the metal oxide includes a metal superoxide, a metal superoxide radical, and/or a metal peroxide.

B1. A cathode material, comprising: a cathode active material including a metal compound and a metal oxide; wherein the metal compound has an empirical formula of $M_aR_b$, wherein M is a metal; R is an atom, a molecule, or a radical; and a and b are independently positive nonzero real numbers; and the metal oxide has an empirical formula of $M'_xO_y$, wherein M' is a metal, and x and y are independently positive nonzero real numbers; such that the metal compound and the metal oxide are in contact; and an electrically-conductive material; such that one or both of the metal compound and the metal oxide are in contact with the electrically-conductive material.

B2. The cathode material of paragraph B1, wherein M and M' may be the same or different, and are selected from lithium, sodium, potassium, beryllium, magnesium, calcium, vanadium, iron, nickel, copper, zinc, and aluminum.

B3. The cathode material of paragraph B1, wherein the electrically-conductive material includes a porous carbon material.

B4. The cathode material of paragraph B3, wherein the porous carbon material is doped with one or more heteroatoms selected from boron, nitrogen, sulfur, phosphorous, fluorine, chlorine, and bromine.

B5. The cathode material of paragraph B1, wherein the electrically-conductive material includes one or more of carbon black, carbon nanotubes, carbon nanofibers, carbon dots, activated carbon, graphite, graphene, graphene oxide, and graphene nanoribbons.

B6. The cathode material of paragraph B1, further comprising one or more of a polymeric binder, a plasticizer, and a carboxylic acid.

C1. A battery having a cathode, wherein the cathode includes a cathode active material that includes a metal compound having an empirical formula of $M_aR_b$, wherein M is a metal; R is an atom, a molecule, or a radical; and a and b are independently positive nonzero real numbers; and a metal oxide having an empirical formula of $M'_xO_y$, wherein M' is a metal, and x and y are independently positive nonzero real numbers; wherein the metal compound and the metal oxide are in contact.

C2. The battery of paragraph C1, wherein the cathode evolves substantially zero gaseous oxygen during operation of the battery.

C3. The battery of paragraph C1, wherein the battery exhibits at least 500 mAh/g of discharge specific capacity based on the amount of the cathode active material at a current density of greater than or equal to 0.1 mA/cm$^2$.

C4. The battery of paragraph C1, wherein the battery can produce at least 3.0 V of average operating discharge potential versus Li/Li$^+$ at a current density of greater than or equal to 0.1 mA/cm$^2$.

C5. The battery of paragraph C1, wherein the battery is substantially rechargeable.

C6. The battery of paragraph C1, wherein the battery is operable at a room temperature.

C7. The battery of paragraph C1, further comprising an anode, wherein the anode includes an anode active material at least partially enclosed by a coating layer on an outer surface of the anode material, wherein the coating layer includes carbon and oxygen.

C8. The battery of paragraph C1, further comprising a liquid, solid, or semi-solid electrolyte, wherein the electrolyte includes an electrolytic solvent.

C9. The battery of paragraph C1, further comprising a greenhouse gas that is liquified, in contact with the electrolyte, or dissolved in the electrolyte.

C10. The battery of paragraph C9, wherein the greenhouse gas includes one or more of carbon dioxide ($CO_2$), methane ($CH_4$), sulfur hexafluoride ($SF_6$), a perfluorocarbon compound, a chlorofluorocarbon compound, and a hydrofluorocarbon compound.

C11. The battery of paragraph C1, further comprising a separator, wherein the separator includes a polymeric material.

C12. The battery of paragraph C1, further comprising a current collector including an alloy of one or more of molybdenum, titanium, and zirconium.

Advantages, Features, Benefits

The cathode active materials of the present disclosure permit the fabrication of high-energy cathodes for batteries that are economical, provide high discharge capacities, high discharge potentials, and are not subject to oxygen evolution during operation.

Selected batteries of the present disclosure exhibit discharge specific capacities of at least 100 mAh/g, based on the amount of the cathode active material, at a current density of greater than or equal to 0.1 mA/cm$^2$. In some embodiments, the batteries of the present disclosure can exhibit discharge specific capacities of greater than 200 mAh/g, greater than 300 mAh/g, and greater than 500 mAh/g, based on the amount of the cathode active material, at current densities of greater than or equal to 0.1 mA/cm$^2$.

Selected batteries of the present disclosure can exhibit average operating discharge potentials greater than 1.0 V versus Li/Li$^+$. In some embodiments, the batteries of the present disclosure can exhibit average operating discharge potentials greater than 2.0 V, greater than 3.0 V, or even greater than 4.0 V, versus Li/Li$^+$. Typically, such batteries may produce an average operating discharge potential of at least 3.0 V versus Li/Li$^+$ at a current density of greater than or equal to 0.1 mA/cm$^2$.

All current densities presented in this disclosure are normalized by the planar area of the cathode.

Selected batteries of the present disclosure may be substantially rechargeable. In one aspect of the disclosure, a battery may be considered substantially rechargeable if it exhibits a cycle number greater than 100. Alternatively, or in addition, selected batteries of the present disclosure may operate efficiently at room temperature, which in one embodiment may be defined as 15° C.-30° C.

Cathodes prepared according to the methods of the present disclosure can operate with an evolution of less than 1 mg per 1 mAh of gaseous oxygen during a full lifecycle of the battery including the cathode. In some cases, the cathodes of the present disclosure exhibit substantially zero evolution of gaseous oxygen during operation.

The cathode active material of the present disclosure exhibits a standard redox potential above 3.0 V versus Li/Li$^+$.

The term "combination" or "combinations" means, unless otherwise stated, all types of combinations, starting from two of the relevant constituents, to a plurality or all of such constituents.

The illustration of the steps of a method, whether shown in the drawings or described in the description, should not be considered to illustrate the specific order of the method steps, unless the order is specifically provided. The order of such steps may differ from what is depicted and described, and/or two or more steps may be performed concurrently or with partial concurrence, unless specified differently.

The features and variants specified in the individual embodiments and examples can be freely combined with those of the other examples and embodiments and in particular be used to characterize the invention in the claims without necessarily implying the other details of the respective embodiment or the respective example.

The disclosure set forth above may encompass multiple distinct examples with independent utility. Although each of these has been disclosed in one or more illustrative form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A cathode active material, comprising:
   a metal compound having an empirical formula of $M_aR_b$, wherein M is a metal selected from lithium, sodium, potassium, beryllium, magnesium, calcium, vanadium, iron, nickel, copper, zinc, or aluminum; and each R is independently an inorganic moiety; where a and b are independently positive nonzero real numbers and a is greater than 1; and
   a metal oxide having an empirical formula of $M_xO_y$, wherein M is the same metal in the metal compound, and x and y are independently positive nonzero real numbers;
   wherein the metal compound and the metal oxide are in contact and are associated with one another in a complex, a cluster, or in a crystalline, quasi-crystalline, or amorphous matrix.

2. The cathode active material of claim 1, wherein each R is selected from hydride, halide, oxide, hydroxide, chlorate, sulfide, sulfate, metaborate, thiocyanate, amide, nitride, and azide.

3. A cathode material, comprising:
   a cathode active material including a metal compound and a metal oxide;
   wherein the metal compound has an empirical formula of $M_aR_b$, wherein M is a metal selected from lithium, sodium, potassium, beryllium, magnesium, calcium, vanadium, iron, nickel, copper, zinc, or aluminum; and each R is independently an inorganic moiety; and where a and b are independently positive nonzero real numbers and a is greater than 1;
   the metal oxide has an empirical formula of $M_xO_y$, wherein M is the same metal in the metal compound, and x and y are independently positive nonzero real numbers;
   such that the metal compound and the metal oxide are in contact and are associated with one another in a complex, a cluster, or in a crystalline, quasi-crystalline, or amorphous matrix; and
   an electrically-conductive material;
   such that one or both of the metal compound and the metal oxide are in contact with the electrically-conductive material.

4. The cathode material of claim 3, wherein the electrically-conductive material includes a porous carbon material.

5. The cathode material of claim 4, wherein the porous carbon material is doped with one or more heteroatoms selected from boron, nitrogen, sulfur, phosphorous, fluorine, chlorine, and bromine.

6. The cathode material of claim 4, wherein the electrically-conductive material includes one or more of carbon black, carbon nanotubes, carbon nanofibers, carbon dots, activated carbon, graphite, graphene, graphene oxide, or graphene nanoribbons.

7. The cathode material of claim 3, further comprising one or more selected from the group consisting of a polymeric binder, a plasticizer, and a carboxylic acid.

8. A battery having a cathode including a cathode active material that comprises:
   a metal compound having an empirical formula of $M_aR_b$, wherein M is a metal selected from lithium, sodium, potassium, beryllium, magnesium, calcium, vanadium, iron, nickel, copper, zinc, or aluminum; and each R is independently an inorganic moiety; and where a and b are independently positive nonzero real numbers and a is greater than 1;
   and a metal oxide having an empirical formula of $M_xO_y$, wherein M is the same metal in the metal compound, and x and y are independently positive nonzero real numbers;
   wherein the metal compound and the metal oxide are in contact and are associated with one another in a complex, a cluster, or in a crystalline, quasi-crystalline, or amorphous matrix.

9. The battery of claim 8, wherein the battery can produce at least 3.0-4.0 V of average operating discharge potential versus $Li/Li^+$ at a current density of 0.1-1.0 $mA/cm^2$.

10. The battery of claim 8, wherein the battery exhibits a cycle number greater than 100.

11. The battery of claim 8, wherein the battery is operable at room temperature.

12. The battery of claim 8, further comprising an anode, wherein the anode includes an anode active material at least partially enclosed by a coating layer that includes carbon and oxygen on an outer surface of the anode active material.

13. The battery of claim 8, further comprising a liquid, solid, or semi-solid electrolyte, wherein the electrolyte includes an electrolytic solvent.

14. The battery of claim 13, further comprising a greenhouse gas that is liquified, in contact with the electrolyte, or dissolved in the electrolytic solvent.

15. The battery of claim 14, wherein the greenhouse gas includes one or more of carbon dioxide ($CO_2$), methane ($CH_4$), sulfur hexafluoride ($SF_6$), a perfluorocarbon compound, a chlorofluorocarbon compound, and a hydrofluorocarbon compound.

16. The battery of claim 8, further comprising a separator, wherein the separator includes a polymeric material.

17. The battery of claim 8, further comprising a cathode current collector including an alloy of one or more selected from the group consisting of molybdenum, titanium, and zirconium.

* * * * *